United States Patent

Cone

[15] 3,652,883
[45] Mar. 28, 1972

[54] VEHICLE POWER GENERATOR
[72] Inventor: William H. Cone, 733 Russell Road, Waterloo, Iowa 50701
[22] Filed: Sept. 18, 1970
[21] Appl. No.: 73,496

[52] U.S. Cl. .................................310/74, 310/75, 310/168
[51] Int. Cl. .....................................................H02k 7/02
[58] Field of Search ............................310/168, 75, 75 C, 74

[56] References Cited

UNITED STATES PATENTS

| | | | |
|---|---|---|---|
| 3,317,765 | 5/1967 | Cone | 310/74 |
| 2,073,760 | 3/1937 | Schou | 310/168 |
| 3,215,877 | 11/1965 | Raver et al | 310/168 |

Primary Examiner—D. X. Sliney
Attorney—Zarley, McKee & Thomte

[57] ABSTRACT

An electrical power generator for a vehicle having an engine including a clutch bell housing having a clutch means mounted therein. The clutch means includes a plate cover secured to the engine flywheel for rotation therewith. A field means is mounted in the clutch bell housing and is adapted to create a magnetic field. A stator means is mounted on the inner periphery of the clutch bell housing and includes an electrical output means in the said magnetic field and adapted to be connected to an electrical load. A rotor means is secured to the plate cover for rotation therewith within said clutch bell housing. The rotor means is provided with a plurality of spaced apart teeth on the periphery thereof whereby the rotation of the rotor means by the plate cover will cause the teeth to vary the permeance of the magnetic field to induce an alternating electromotive force in the output means.

4 Claims, 5 Drawing Figures

PATENTED MAR 28 1972 3,652,883
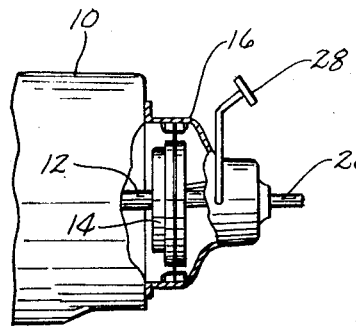
Fig. 1
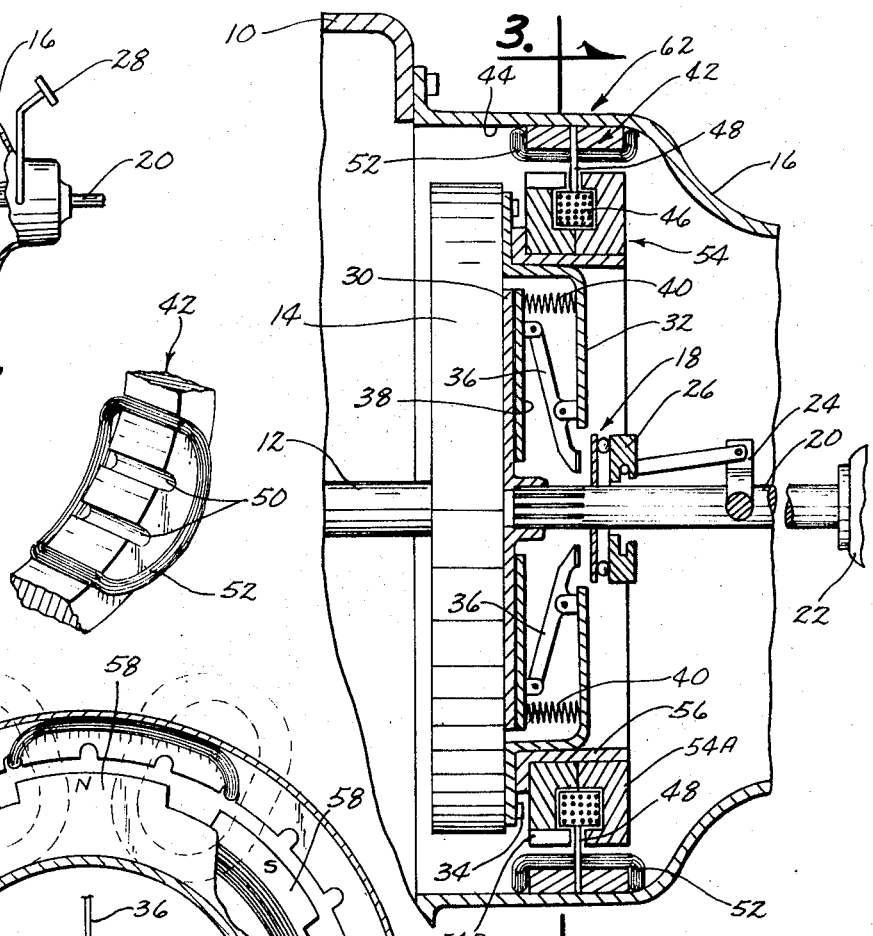
Fig. 2
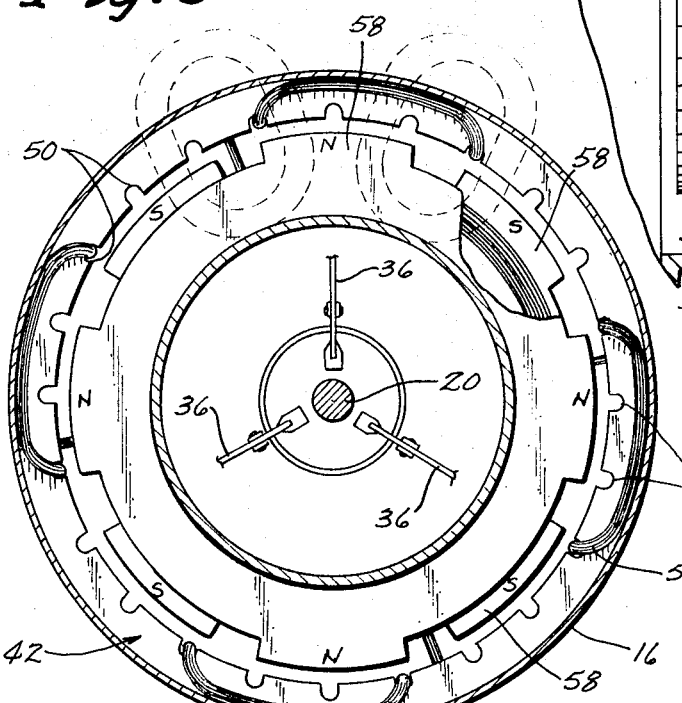
Fig. 5
Fig. 3
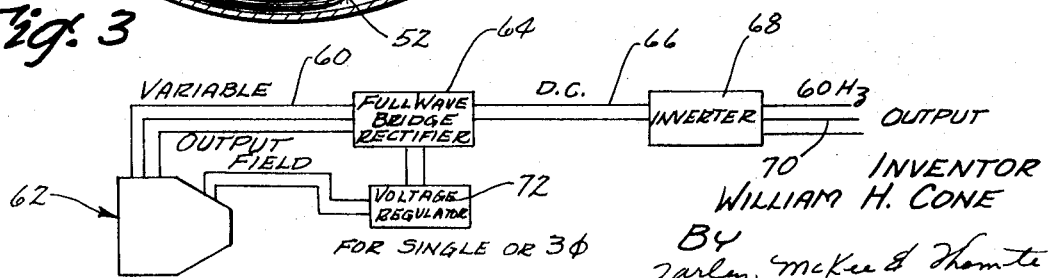
Fig. 4
INVENTOR
WILLIAM H. CONE
BY
Zarley, McKee & Thomte
ATTORNEYS

VEHICLE POWER GENERATOR

Each year finds the more and more demands are being made on the motors of trucks, and automobiles for the generation of electrical power to serve air conditioning, refrigeration, and other power-consuming equipment. Generators and alternators place additional operating loads on the vehicle motor and consume valuable space. They are ordinarily powered by means of belts operating from a motor drive shaft, and the belts themselves create a maintenance problem. The powering of these units by the motor is often damaging to the engine crankshaft and main bearing.

Applicant previously designed a combination vehicle motor and electrical power unit in an effort to overcome the problems enumerated above. On May 2, 1967, applicant was granted U.S. Letters Pat. No. 3,317,765 on the said unit. The instant invention represents a distinct improvement over applicant's earlier unit and reliance on U.S. Pat. No. 3,317,765 is hereby made to complete this disclosure.

Therefore, a principal object of this invention is to provide a vehicle power generator which eliminates the need for special mounts, pulleys, belt tighteners, idlers and the like.

A further object of this invention is to provide a vehicle power generator which requires no lubrication.

A still further object of this invention is to provide a vehicle power generator not easily subject to damage or malfunction and which is protected from the elements.

A still further object of this invention is to provide a vehicle power generator which will not add to the space requirements for the usual engine.

A still further object of this invention is to provide a vehicle power generator which will not add to the wear on the engine crank shaft and main bearing.

A still further object of this invention is to provide a vehicle power generator which can be incorporated on any engine without interfering with the usual engine components.

A further object of this invention is to provide a vehicle power generator which is mounted in the clutch bell housing.

A further object of this invention is to provide a vehicle power generator that is economical of manufacture and durable in use.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings, in which:

FIG. 1 is a side elevational view of the device of this invention with portions thereof cut away to more fully illustrate its construction;

FIG. 2 is an enlarged sectional view of that portion of FIG. 1 where the clutch bell housing is secured to the vehicle motor;

FIG. 3 is a sectional view seen along lines 3—3 of FIG. 2.

FIG. 4 is a block diagram schematically showing the circuitry of the device; and FIG. 5 is a partial perspective view of the clutch bell housing with one of the field winding coils mounted thereon.

The numeral 10 generally designates a vehicle engine with a horizontally and outwardly extending drive shaft 12 having a flywheel 14 mounted on its rearward end. The numeral 16 generally designates a clutch bell housing which is secured to the engine 10 in conventional fashion and which houses the clutch means 18. The clutch means illustrated herein is the conventional type of clutch means ordinarily used in conjunction with a standard transmission but it should be understood that the device of this invention can also be utilized with those clutches associated with automatic transmissions.

Shaft 20 extends forwardly from transmission 22 into the bell housing 16. A clutch bell crank 24 is provided in the housing 16 and is connected to the throw-out bearing 26 in conventional fashion. The bell crank 24 is operatively connected to the clutch pedal 28.

A friction or driven plate 30 is splined onto the forward end of shaft 20 for rotation therewith and is longitudinally movably mounted thereon. Plate 30 is adapted to be moved into frictional engagement with the flywheel 14 to cause the rotation of shaft 20 upon the clutch pedal 28 being released. The numeral 32 refers to a plate cover commonly referred to as a pressure plate cover and which is secured to the flywheel 14 by screws or bolts 34. A plurality of clutch operating fingers or levers 36 are pivotally connected to the cover 32 as seen in FIG. 2 and are pivotally connected to a pressure plate 38. Compression springs 40 normally urge the pressure plate 38 into engagement with the driven plate 30. As seen in FIG. 2, throw-out bearing 26 is adapted to engage the inner ends of the levers 36 to move the pressure plate 38 away from engagement with the driven plate 30. In operation, the depressing of the clutch pedal 28 causes bell crank 24 to slidably move the throw-out bearing 26 forwardly on shaft 20 to cause the levers 36 to move the pressure plate 38 out of engagement with the driven plate 30. With the pedal 28 depressed, rotation of flywheel 14 will not cause the rotation of the driven plate 30. When pedal 28 is released, the bell crank 24 causes throw-out bearing 26 to be moved rearwardly on shaft 20 which permits the compression springs 40 to force the pressure plate 38 against the driven plate 30 so that the driven plate 30 frictionally engages flywheel 14. The frictional engagement of the drive plate 30 with flywheel 14 causes the driven plate 30 to be driven which in turn causes the rotation of shaft 20. As seen in FIG. 2, cover 32 and its associated components rotate with the flywheel 14.

The numeral 42 generally designates a stator means which is mounted on the inner periphery 44 of the clutch bell housing 16 by any convenient means. The stator means 42 is identical to the stator means disclosed in U.S. Pat. No. 3,317,765 and reliance on that disclosure is hereby made. A field winding coil 46 is positioned in the clutch bell and is supported by a plurality of posts 48 extending from the stator means 42. The posts 48 are constructed of a non-magnetic conductive material so as to insulate the coil 46 from the stator 42.

It is preferred that rotor means 54 be provided with induced residual magnetism to permit the rotor means to create a magnetic field independent of the vehicle electrical system. The stator means 42 includes a plurality of transverse grooves 50 formed therein. Output coils 52 are mounted on the stator means 42 in the slots 50 and are electrically interconnected as disclosed in said earlier patent. Only one set of coils 52 have been shown in FIG. 3, it being understood that additional coils are used in the remaining slots 50 in accordance with said patent. Rotor means 54 is operatively secured to the cover 32 by any convenient means for rotation therewith within the clutch bell housing 16. As seen in FIG. 2, a non-ferrous material such as aluminum or the like is positioned between the rotor means 54 and the cover 32 and is referred to by the reference numeral 56. Material 56 prevents the formation of a "sneak" magnetic circuit through the clutch assembly and insures the magnetic circuit being formed through the alternator. Rotor means 54 includes a plurality of rotor teeth 58 extending therefrom in the manner illustrated in FIG. 2 and 3 and in the manner disclosed in said earlier patent. As seen in FIG. 4, output leads 60 extend from the alternator 62 and are connected to a full wave bridge rectifier which rectifies the variable hertz output of the alternator into direct current. The rectifier 64 is connected by leads 66 to an inverter 68 which is connected to the load by leads 70. The voltage in the circuit is sensed by the voltage regulator 72 which controls the field current. The rotor teeth in each rotor half 54A and 54B are staggered with respect to each other (FIG. 3).

In operation, the rotation of the flywheel 14 by the shaft 12 causes the cover 32 to be rotated within the clutch bell housing 16 which in turn causes the rotation of the rotor means 54 with respect to the coil 46. The rotation of the rotor 54 causes the teeth 58 to pass through the magnetic circuit previously described to vary the permeance of the magnetic filed to induce an alternating electromotive force in the output coils 52. The alternating electromotive force is supplied to the full wave bridge rectifier as previously described.

While the drawings illustrate the stator to be wound for three phase current, it should be noted that the stator can be modified for single phase current. Thus it can be seen that an extremely efficient vehicle power generator has been provided which does not require special mounts, pulleys, belt tighteners, idlers and the like. It can further be seen that the alternator or power generator described herein will not add to the wear on the engine crankshaft and main bearing and does not add to the space requirements for the usual engine. The power generator disclosed herein is conveniently mounted within the clutch bell housing and is easily serviced by simply removing the clutch bell housing from the engine. Additionally, a vast majority of the clutch bell housings include access panels thereon which would further aid in servicing the generator unit therein. The device of this invention also permits a much larger power generating mechanism to be used, thus increasing the capabilities of the unit. The power generator disclosed herein represents a distinct improvement over said earlier patent and accomplishes at least all of its stated objectives.

I claim:

1. In combination with a vehicle engine having a block, a driveshaft extending from said block, a flywheel mounted on said driveshaft, a clutch bell housing secured to said block, a clutch means in said clutch bell housing including a driven plate and a pressure plate, said clutch means including a plate cover means secured to said flywheel for rotation therewith, and a driven shaft operatively connected to said driven plate and extending therefrom, a field means mounted in said clutch bell housing adapted to create a magnetic field, a stator means mounted on the inner periphery of said clutch bell housing and including an electrical output means in said magnetic field adapted to be connected to an electrical load, a rotor means secured to said plate cover means for rotation therewith within said clutch bell housing, said rotor means including a plurality of spaced apart teeth on the periphery of the rotor means whereby the rotation of said rotor means by said plate cover means will cause said teeth to vary the permeance of said magnetic field to induce an alternating electromotive force in said output means, and a non-ferrous metal positioned between said rotor means and said plate cover means.

2. The combination of claim 1 wherein said field means comprises a rotor means having an induced residual magnetism.

3. The combination of claim 1 wherein said field means comprises a field coil means adapted to create said magnetic field independently of the vehicle engine electrical circuit.

4. In combination with a vehicle engine having a block, a crankshaft extending from said block, a flywheel mounted on said crankshaft, and a clutch housing secured to said block, an electrical power generating means comprising, a field means mounted in said clutch housing at the inner periphery thereof adapted to create a magnetic field, a stator means mounted on the inner periphery of said clutch housing and including an electrical output means in said magnetic field adapted to be connected to an electrical load, a rotor means operatively secured to said flywheel for rotation therewith within said clutch housing, said rotor means including means on the periphery thereof whereby the rotation of said rotor means by said flywheel will cause said means to vary the permeance of said magnetic field to induce an alternating electromotive force in said output means, and a non-ferrous metal positioned between said rotor means and said flywheel.

* * * * *